United States Patent
Hester, Jr. et al.

(10) Patent No.: US 8,979,032 B1
(45) Date of Patent: Mar. 17, 2015

(54) METHODS AND SYSTEMS FOR RETRIEVING PERSONNEL

(75) Inventors: William Clayton Hester, Jr., Allen, TX (US); William J. Gray, III, Lewisville, TX (US); Deon Austin Harkey, McKinney, TX (US)

(73) Assignee: The Boeing Company, Chicago, IL (US)

( * ) Notice: Subject to any disclaimer, the term of this patent is extended or adjusted under 35 U.S.C. 154(b) by 584 days.

(21) Appl. No.: 13/275,974

(22) Filed: Oct. 18, 2011

(51) Int. Cl.
- *B64D 1/22* (2006.01)
- *B64C 1/32* (2006.01)
- *B64C 1/14* (2006.01)

(52) U.S. Cl.
CPC ... *B64D 1/22* (2013.01); *B64C 1/32* (2013.01); *B64C 1/1423* (2013.01); *B64C 2201/141* (2013.01); *B64C 2201/024* (2013.01); *B64C 2201/128* (2013.01)
USPC .............................. 244/137.4; 244/190; 701/3

(58) Field of Classification Search
USPC ................ 244/189, 190, 137.1, 137.2, 137.4; 258/1.2, 1.4; 701/2, 3
See application file for complete search history.

(56) References Cited

U.S. PATENT DOCUMENTS

| | | | | |
|---|---|---|---|---|
| 3,601,342 | A * | 8/1971 | Piasecki | 244/137.4 |
| 3,934,847 | A * | 1/1976 | Bentivegna | 244/137.2 |
| 5,494,240 | A * | 2/1996 | Waugh | 244/137.4 |
| 8,308,142 | B1 * | 11/2012 | Olson | 258/1.4 |
| 2004/0075018 | A1 | 4/2004 | Yamane | |
| 2005/0184195 | A1 * | 8/2005 | Jonas | 244/137.2 |
| 2006/0060694 | A1 | 3/2006 | Nonami et al. | |
| 2008/0152887 | A1 * | 6/2008 | Sakai et al. | 428/221 |
| 2009/0069957 | A1 | 3/2009 | Nakamura | |
| 2009/0146010 | A1 * | 6/2009 | Cohen | 244/137.1 |
| 2009/0256750 | A1 | 10/2009 | Mathews et al. | |
| 2010/0044156 | A1 * | 2/2010 | Tkebuchava | 182/231 |
| 2010/0096508 | A1 * | 4/2010 | Pancotti et al. | 244/7 R |

OTHER PUBLICATIONS

"Introducing the Alpine Wasp" Bartlett, Lauren, Feb. 15, 2008, Idealog, available at http://www.idealog.co.nz/magazine/13/air-everest.*

"Remote-controlled copter ro rescue Everest climbers" Simonite, Tom, Feb. 12, 2007, New Scientist, available at http://www.newscientist.com/article/dn11166-remotecontrolled-copter-to-rescue-everest-climbers.html.*

"Combat Survivor/Evader Locator (CSEL)" Federation of American Scientists (FAS), Jan. 9, 1999, available at https://www.fas.org/man/dod-101/sys/ac/equip/csel.htm.*

"Coast Guard Helicopter Crew Saves Four Fisherman from Bering Sea" Thompson, Kalee, Oct. 1, 2009, Popular Mechanics, available at http://www.popularmechanics.com/outdoors/4288762.*

Combat Survivor Evader Locator (CSEL); The Boeing Company IDS Business Support, Communications and Community Affairs; Nov. 3, 2006; 2 pages.

A160T Hummingbird; The Boeing Company Boeing Defense, Space & Security; Oct. 2010; 3 pages.

* cited by examiner

*Primary Examiner* — Joseph W Sanderson
(74) *Attorney, Agent, or Firm* — Armstrong Teasdale LLP

(57) ABSTRACT

A method for retrieving personnel is provided. The method includes receiving a radio signal indicating a real-time position of personnel to be retrieved, deploying an unmanned aerial vehicle to the real-time position, receiving an indication that the personnel to be retrieved is on-board the unmanned aerial vehicle, and operating the unmanned aerial vehicle to move the personnel to a different location.

14 Claims, 7 Drawing Sheets

METHODS AND SYSTEMS FOR RETRIEVING PERSONNEL

BACKGROUND

The field of the disclosure relates generally to search and rescue operations, and more specifically, to retrieving personnel.

Due to unforeseen circumstances, personnel may become stranded in an unfamiliar and/or hostile location. Such personnel typically need to be rescued and/or retrieved from the unfamiliar and/or hostile location. Before the personnel can be retrieved, however, the feasibility of the rescue operation is often evaluated.

To determine the feasibility of a rescue operation, several different variables may be considered. For example, the status, condition, and/or exact location of the personnel are generally determined. Furthermore, the proximity and intensity of hostile activity around the personnel may be considered. For example, hostile forces aware of the stranded personnel may attempt to ambush any attempted rescue operation.

As such, given the state of the personnel and hostile activity, a proposed rescue operation that is likely to result in further casualties and/or injuries may not progress beyond an initial planning state, or may be canceled while underway. Accordingly, at least some known systems and method for personnel retrieval typically will not be used in a relatively risky and/or hostile personnel retrieval scenario.

BRIEF DESCRIPTION

In one aspect, a method for retrieving personnel is provided. The method includes receiving a radio signal indicating a real-time position of personnel to be retrieved, deploying an unmanned aerial vehicle to the real-time position, receiving an indication that the personnel to be retrieved is on-board the unmanned aerial vehicle, and operating the unmanned aerial vehicle to move the personnel to a different location.

In another aspect, a personnel extraction system is provided. The system includes a hand held radio operable to transmit a position of the radio, an unmanned aerial vehicle operable to receive a radio signal indicating a real-time position of personnel to be retrieved, deploy to the real-time position, and transport the personnel to a different location, and a command center operable to control a deployment of the unmanned aerial vehicle.

In yet another aspect, a rescue pod for use in retrieving personnel is provided. The rescue pod includes a top wall, a bottom wall, a first side wall, and a second side wall that define a passenger compartment, an absorption layer positioned between the bottom wall and a floor of the passenger compartment, the absorption layer operable to absorb an impact force to protect a user positioned within the passenger compartment, and at least one door that provides the user access to the passenger compartment.

In yet another aspect, an unmanned aerial vehicle for use in retrieving personnel is provided. The unmanned aerial vehicle includes a communication module operable to a receive a signal indicating a real-time position of personnel to be retrieved from a hand-held radio, and a control module coupled to the communication module and configured to generate a flight path to the real-time position, and command the unmanned aerial vehicle to deploy to the real-time position along the flight path.

In yet another aspect, a hand held radio for use in retrieving personnel is provided. The hand held radio includes a navigation module operable to determine a real-time position of personnel, a communication module operable to continuously transmit the real-time position of the personnel to an unmanned aerial vehicle, and a user input module operable to receive input from the personnel.

In yet another aspect, a method for authorizing communications between a hand held radio and an unmanned aerial vehicle for retrieval of personnel is provided. The method includes transmitting, using the hand held radio, a request for retrieval of personnel to a command center, determining, at the command center, whether the personnel are authorized for retrieval, and permitting the unmanned aerial vehicle to communicate with the hand held radio when the personnel are authorized for retrieval.

In yet another aspect, a system for retrieving personnel is provided. The system includes a hand held radio operable to transmit a position of the radio, an unmanned aerial vehicle operable to receive the transmitted position and travel to the transmitted position, and a rescue pod coupled to the unmanned aerial vehicle and operable to transport the personnel from the transmitted position.

The features, functions, and advantages that have been discussed can be achieved independently in various embodiments or may be combined in yet other embodiments, further details of which can be seen with reference to the following description and drawings.

DETAILED DESCRIPTION

The systems and methods described herein facilitate retrieving personnel. A user operates a hand held radio to communicate with an unmanned aerial vehicle and a command center. When the command center authorizes communication between the unmanned aerial vehicle and the hand held radio, the hand held radio transmits information indicating a position of the user to the unmanned aerial vehicle. The unmanned aerial vehicle uses the position information to travel to the location of the user. Once the unmanned aerial vehicle reaches the user, the user boards a rescue pod attached to the unmanned aerial vehicle, and the unmanned aerial vehicle transports the rescue pod and the user to a different location. As used herein, "personnel" refers to any person and/or persons (e.g., civilian, military, etc.) that may be retrieved using the systems and methods described herein.

Figure 1:
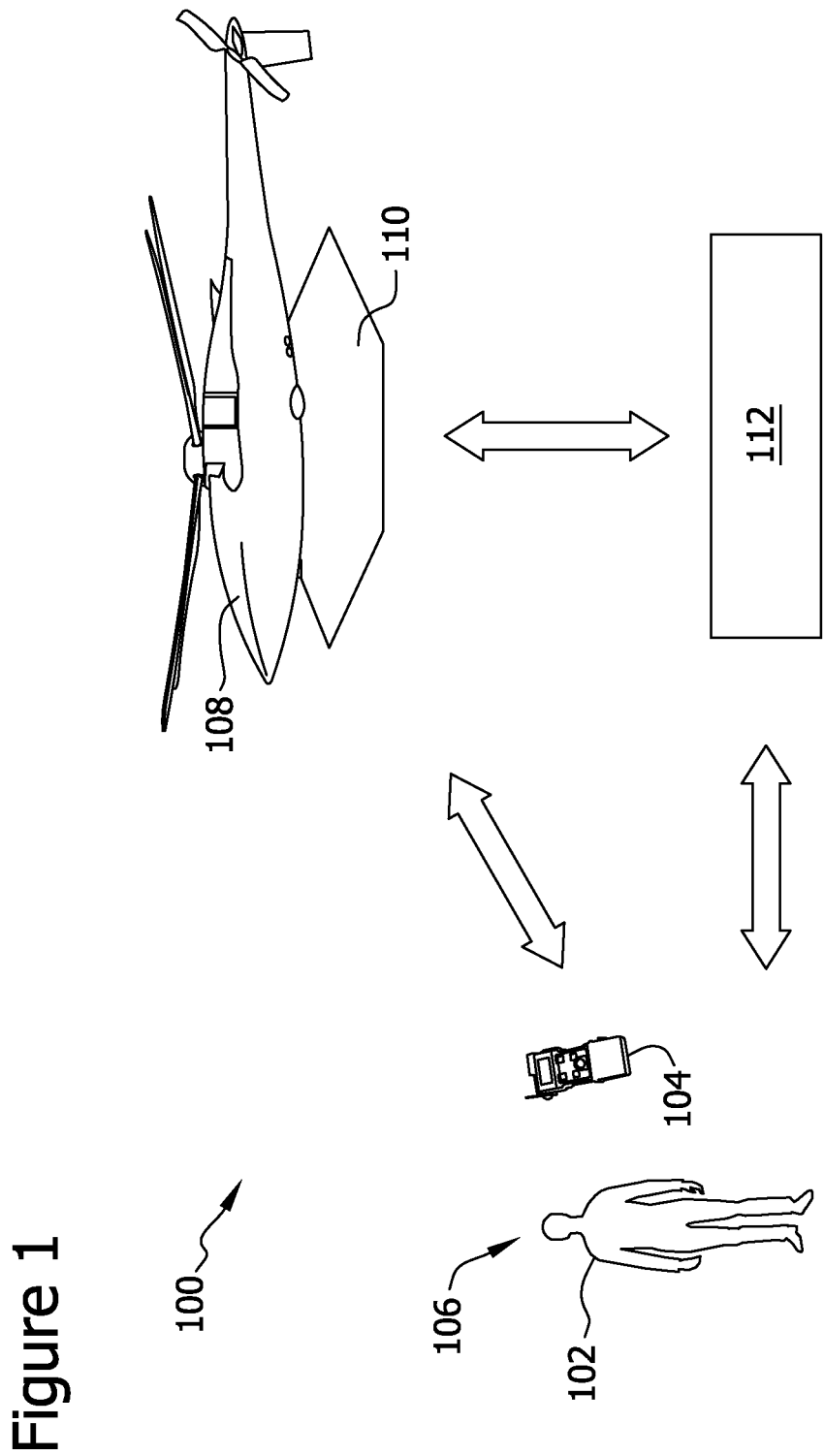
FIG. 1 is a schematic diagram of an exemplary retrieval system.

FIG. 1 is a schematic diagram of an exemplary retrieval system 100. System 100 includes a user 102 equipped with a radio device 104. The user 102 is located at a pick-up location 106. System 100 further includes an unmanned aerial vehicle 108 and a rescue pod 110 coupled to unmanned aerial vehicle 108. Unmanned aerial vehicle 108 locates user 102 by communicating with radio device 104. Accordingly, unmanned aerial vehicle 108 can travel to pick-up location 106. Once unmanned aerial vehicle 108 reaches pick-up location 106, user 102 can board rescue pod 110, and unmanned aerial vehicle 108 can transport rescue pod 110 and user 102 away from pick-up location 106.

In the exemplary embodiment, a ground command center 112 communicates with unmanned aerial vehicle 108 and/or user 102 using radio device 104. Ground command center 112 coordinates pick-up of user 102. In the exemplary embodiment, ground command center 112 facilitates conducting an authentication process for system 100, as described in detail below. Moreover, a human operator (not shown) at ground command center 112 may operate and/or control unmanned aerial vehicle 108.

In the exemplary embodiment, radio device 104, unmanned aerial vehicle 108, and ground command center 112 are all configured to communicate with one another to facilitate rescuing user 102 from pick-up location 106. Detailed operation of system 100 is described herein.

Figure 2:
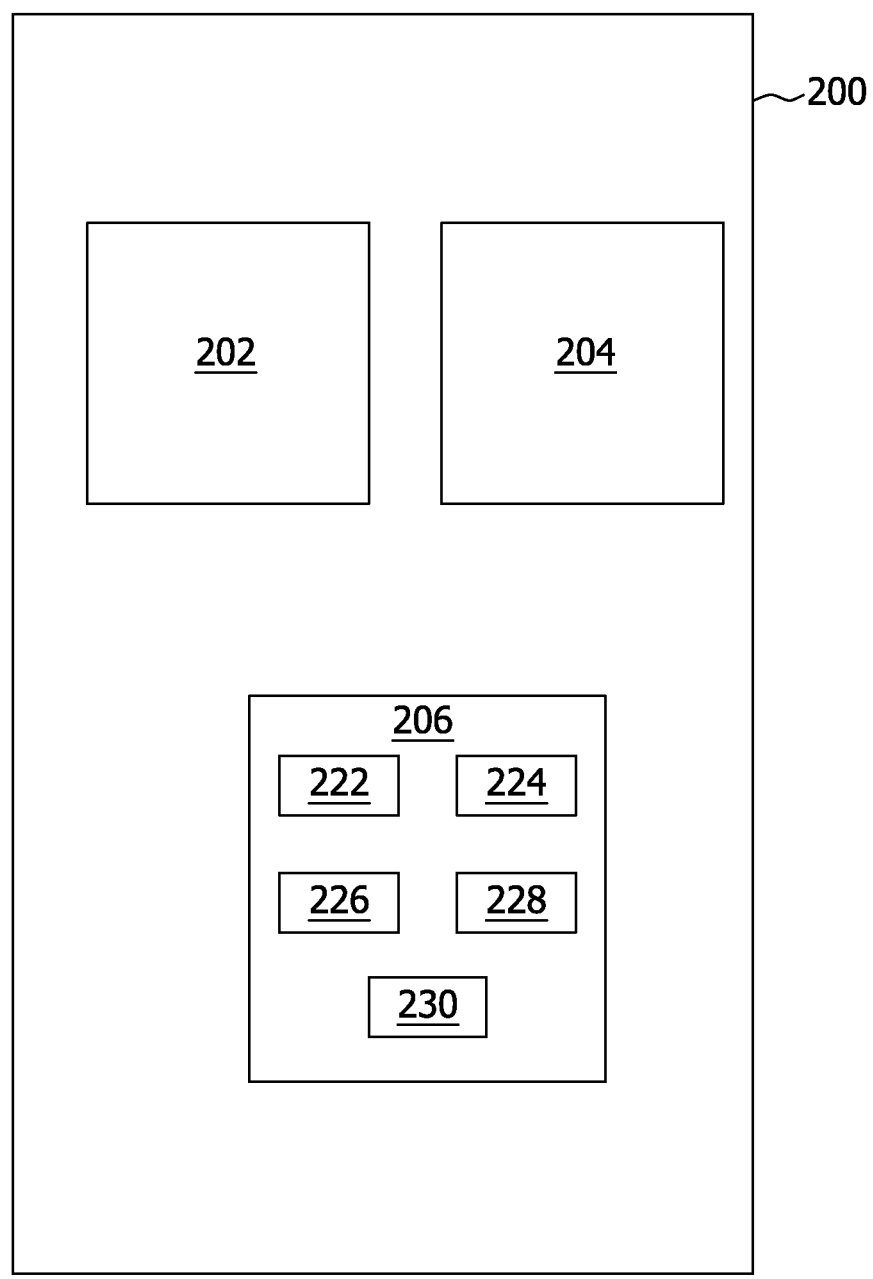
FIG. 2 is a block diagram of an exemplary radio that may be used with the system shown in FIG. 1.

FIG. 2 is a block diagram of an exemplary radio device 200, such as radio device 104, that may be used with system 100 (both shown in FIG. 1). In the exemplary embodiment, radio device 200 is an AN/PRQ-7 Combat Survivor Evader Locator (CSEL) hand-held radio. Alternatively, radio device 200 is any communications device capable of functioning as described herein.

Radio device 200 is relatively small and lightweight, enabling user 102 (shown in FIG. 1) to easily carry and operate radio device 200. In the exemplary embodiment, radio device 200 includes a global positioning system (GPS) module 202, a communications module 204, and an input module 206 that are communicatively coupled to one another.

GPS module 202 calculates geopositional information for radio device 200, and accordingly, user 102. Geopositional information may include, for example, the current latitude, longitude, and/or altitude of radio device 200. The geopositional information may be calculated, for example, by communicating with satellites using communications module 204.

Communications module 204 transmits and receives data for radio device 200. Using communications module 204, Data may be transmitted and received securely, using suitable encryption methods. Further, communications module 204 is capable of utilizing a satellite communication network or similar communication networks to facilitate long range, over-the-horizon, two-way data communications. Moreover, communications module 204 is capable of communicating over multiple communications networks, for an increased response time. Communications module 204 enables radio device 200 to communicate with unmanned aerial vehicle 108 and ground command center 112. Data transmitted by communications module 204 may include geopositional information from GPS module 202, messages from user 102 input using input module 206, and/or any other types of data that enable radio device 200 to function as described herein.

In the exemplary embodiment, communications module 204 transmits geopositional information from GPS module 202 to unmanned aerial vehicle 108 (shown in FIG. 1). In the exemplary embodiment, geopositional information is transmitted continuously to unmanned aerial vehicle 108. Alternatively, geopositional information may be transmitted periodically to unmanned aerial vehicle 108. Unmanned aerial vehicle 108 receives the geopositional information and determines pick-up location 106 (shown in FIG. 1), as described in detail below.

Input module 206 enables user 102 to communicate using radio device 200. In the exemplary embodiment, input module 206 includes a microphone 222 and speaker 224 that enable user 102 to conduct real-time voice communications using communications module 204. Moreover, input module 206 includes an input device 226, such as a keypad and/or keyboard, that enables user 102 to enter text messages. Input module 206 also includes a display device 228 that enables user 102 to view received text messages. Display device 228 may also display other information to user 102. For example display device 228 may display geopositional information from GPS module 202 and/or a map showing the current location of user 102.

Input module 206 also includes a camera 230 that enables user 102 to capture still images and record video with radio device 200. User may use camera 230 to transmit still images and/or video of pick-up location 106 to command control center 112. Further, camera 230 may facilitate identification of user 102 during the authentication process, as described in detail below. Accordingly, with input module 206 and communications module 204, user 102 can directly communicate with ground command center 112 (shown in FIG. 1) via voice, text, still images, and/or video.

Figure 3:
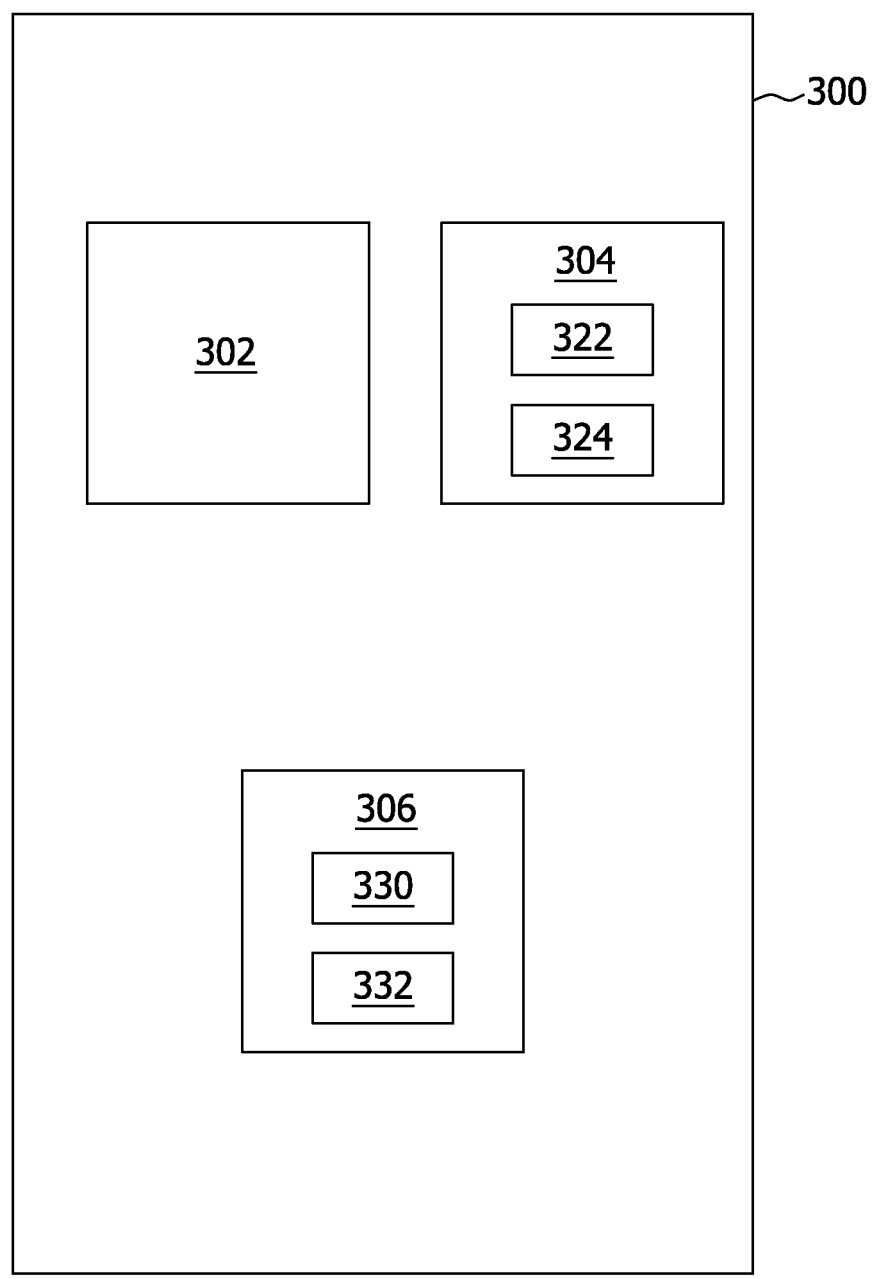
FIG. 3 is a block diagram of an exemplary unmanned vehicle that may be used with the system shown in FIG. 1.

FIG. 3 is a block diagram of an exemplary unmanned aerial vehicle 300, such as unmanned aerial vehicle 108, that may be used with system 100 (both shown in FIG. 1). In the exemplary embodiment, unmanned aerial vehicle 300 is an A160T Hummingbird unmanned utility helicopter. Alternatively, unmanned aerial vehicle 300 is any unmanned vehicle capable of functioning as described herein.

In the exemplary embodiment, unmanned aerial vehicle 300 is a vertical take-off and landing (VTOL) vehicle. Moreover, unmanned aerial vehicle 300 has high altitude capabilities, and may be able to fly higher, further, and longer than similar vehicles that carry human pilots. Further, in some embodiments, unmanned aerial vehicle 300 includes an optimum speed rotor system (not shown) that controls the revolutions per minute (RPM) of rotor blades (not shown) on the unmanned aerial vehicle 300. The optimum speed rotor system facilitates improving engine efficiency and reducing rotor noise of the unmanned aerial vehicle 300.

Unmanned aerial vehicle 300 includes a communications module 302, a control module 304, and an observation module 306 that are communicatively coupled to one other. Communications module 302 transmits and receives data for unmanned aerial vehicle 300. Similar to communications module 204, communications module 302 is capable of securely transmitting data using suitable encryption methods, enabling long-range two-way communications, and communicating over multiple communication networks. Communications module 302 enables unmanned aerial vehicle 300 to communicate with radio device 104 and ground command center 112 (both shown in FIG. 1). Data transmitted and/or received by communications module 302 may include geopositional information, messages to and/or from user 102 using radio device 104, and/or any other types of data that enable unmanned aerial vehicle 300 to function as described herein.

Control module 304 controls the flight and operation of unmanned aerial vehicle 300. In the exemplary embodiment, control module 304 includes an autopilot component 322 and a manual component 324. An operator at ground command center 112 can control unmanned aerial vehicle 300 by transmitting instructions to manual component 324 via communications module 302. Such instructions may be input using a remote control device and/or any other suitable operator input device. Manual component 324 receives the instructions and controls the flight and operation of unmanned aerial vehicle 300 accordingly.

Autopilot component 322 controls the flight and operation of unmanned aerial vehicle 300 without input from a human operator. In the exemplary embodiment, geopositional information received from radio device 104 is provided to autopilot component 322 via communications module 302. Autopilot component 322 utilizes the received geopositional information to calculate a flight path to pick-up location 106 (shown in FIG. 1). As radio device 104 continuously or periodically provides updated geopositional information to autopilot component 322, autopilot component 322 continuously or periodically updates the calculated flight path. Autopilot component 322 controls the operation and flight of unmanned aerial vehicle 300 such that unmanned aerial vehicle 300 follows the calculated flight path. Accordingly, autopilot component 322 flies the unmanned aerial vehicle 300 towards pick-up location 106.

In the exemplary embodiment, autopilot component 322 utilizes digital terrain and/or elevation data to calculate the flight path. Alternatively, autopilot component 322 may use any suitable methods to calculate the flight path. In some embodiments, to facilitate avoiding detection of unmanned aerial vehicle 300, autopilot component 322 may calculated a flight path that is a terrain masking, or nap-of-the-earth (NOE), flight path. Alternatively, autopilot component 322 may calculate a direct flight path.

Observation module 306 includes a camera 330 that monitors the environment surrounding unmanned aerial vehicle 300. Camera 330 acquires still images and/or video of the environment. A human operator at ground command center 112 may monitor the still images and/or video to assist in operation of the unmanned aerial vehicle 300 using manual component 324. In the exemplary embodiment, observation module 306 includes a radar system 332. Radar system 332 may include, for example, forest-penetrating radar to facilitate locating user 102 and/or identifying potential threats to user 102 and/or unmanned aerial vehicle 300.

When unmanned aerial vehicle 300 reaches pick-up location 106, a human operator at ground command center 112 takes control of unmanned aerial vehicle 300 to land unmanned aerial vehicle 300. The human operator may view images transmitted from camera 330 to assist in landing unmanned aerial vehicle 300. Once unmanned aerial vehicle 300 has landed at pick-up location 106, user 102 may board the attached rescue pod 110 (shown in FIG. 1). The operator may then control unmanned aerial vehicle 300 to take off and transport user 102 to a desired location.

Figure 4:
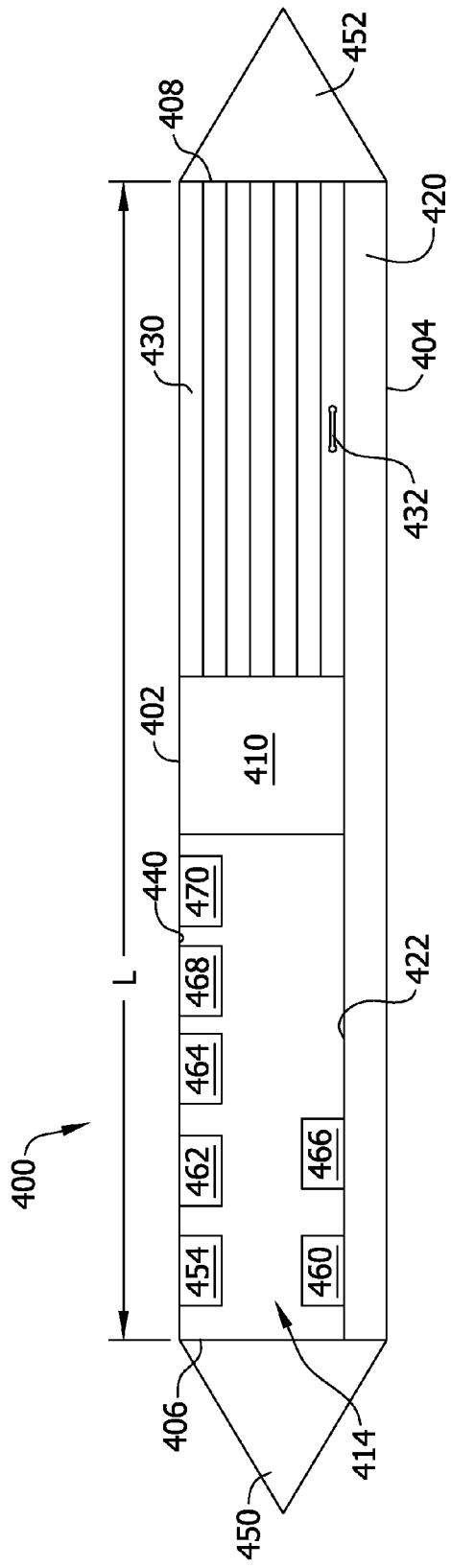
FIG. 4 is a side view of an exemplary rescue pod that may be used with the system shown in FIG. 1.
Figure 5:
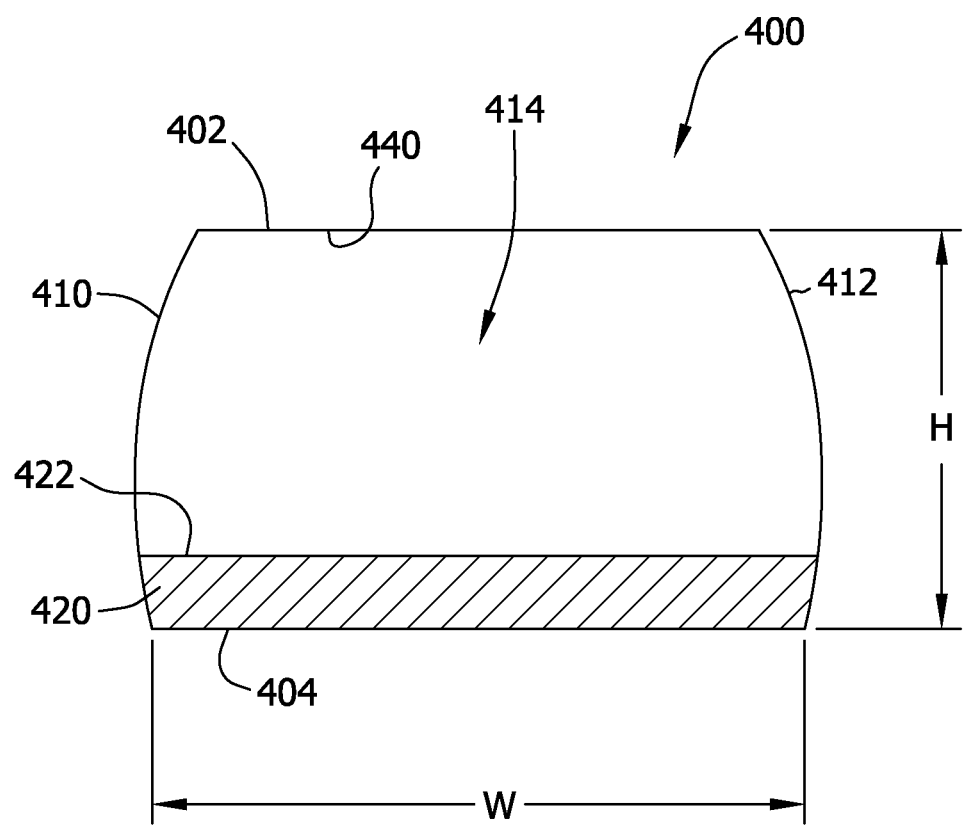
FIG. 5 is a cross-sectional view of the rescue pod shown in FIG. 4.

FIG. 4 is a side view of an exemplary rescue pod 400, such as rescue pod 110, that may be used with system 100 (both shown in FIG. 1). FIG. 5 is a cross-sectional view of rescue pod 400. In the exemplary embodiment, rescue pod 400 is coupled to unmanned aerial vehicle 108 (shown in FIG. 1) using lugs and/or any suitable coupling and/or fastening device. Rescue pod 400 is manufactured from relatively lightweight materials to minimize the load on unmanned aerial vehicle 108. While in the exemplary embodiment, user 102 (shown in FIG. 1) boards a rescue pod, it should be appreciated that other rescue devices may be coupled to unmanned aerial vehicle 108. For example, in some embodiments, a rescue seat and/or harness may be coupled to unmanned aerial vehicle 300 by one or more cables. A rescue seat and/or harness may be useful in collecting user 102 from environments where unmanned aerial vehicle 300 is unable to land.

In the exemplary embodiment, rescue pod 400 includes a top wall 402, a bottom wall 404, a first end 406, and a second end 408. A first side wall 410 and a second side wall 412 extend between top wall 402 and bottom wall 404 to define a passenger compartment 414 within rescue pod 400.

In the exemplary embodiment, bottom wall 404 is manufactured from a material that is damage resistant. For example, bottom wall 404 may be manufactured from Level IV Ceramic Armor that is resistant to small-arms fire. Top wall 402, first side wall 410, and second side wall 412 may also be manufactured from similar materials.

A shock absorption layer 420 is defined between bottom wall 404 and a floor 422 of passenger compartment 414. Shock absorption layer 420 absorbs impact forces when unmanned aerial vehicle 108 lands and takes off, reducing the forces experienced by user 102 when user 102 is located in passenger compartment 414. In the exemplary embodiment, shock absorption layer 420 has a honeycomb structure. Alternatively, shock absorption layer 420 has any structure that facilitates absorbing impact forces. In some embodiments, floor 422 is covered in fire-resistant high density foam to protect user 102.

In the exemplary embodiment, first and second side walls 410 and 412 each include two doors 430. For clarity, only one door 430 is illustrated in FIG. 4. Alternatively, rescue pod 400 includes any number of doors 430 that enable pod 400 to function as described herein. Doors 430 each include a handle 432 to facilitate opening and closing doors 430. To protect user 102, doors 430 are manufactured from a damage resistant material. For example, doors 430 may be manufactured from Kevlar®-clad titanium. Kevlar® is a registered trademark of E. I. du Pont de Nemours and Company, of Wilmington, Del.

In the exemplary embodiment, doors 430 are roll-up doors that roll-up into a ceiling 440 of rescue pod 400 when opened. Alternatively, in some embodiments, doors 430 are clamshell doors that are pivotally attached to top wall 402.

Rescue pod 400 has a width, W, a height, H, and a length, L. In the exemplary embodiment, width W is approximately 32 inches, height H is approximately 30 inches, and length L is approximately 14 feet. Alternatively, rescue pod 400 has any dimensions that enable pod 400 to function as described herein. When boarding rescue pod 400, user 102 lies along length L within passenger compartment 414. In the exemplary embodiment, passenger compartment 414 can hold two users 102 lying end-to-end along length L.

First end 406 includes a first fairing 450, and second end 408 includes a second fairing 452. First and second fairings 450 and 452 each have a conical, aerodynamic shape, and are manufactured from a damage resistant material. In the exemplary embodiment, first and second fairing 450 and 452 are detachably coupled to at least one of top wall 402, bottom wall 404, first side wall 410, and second side wall 412. By operating a release handle 454 mounted in passenger compartment 414, user 102 can detach first and second fairings 450 and 452. Release handle 454 may be mounted on floor 422, ceiling 440, and/or any other interior surface of passenger compartment 414. This enables user 102 to exit rescue pod 400 via first end 406 and/or second end 408 if doors 430 become damaged and/or inoperable.

In the exemplary embodiment, rescue pod 400 includes a harness 460 for securing user 102 during transport, and a light 462 for illuminating passenger compartment 414. Further, rescue pod 400 may include an oxygen source 464 and a portable first aid kit 466 for user 102. Moreover, rescue pod 400 may include a radio 468 that enables user 102 to communicate with, for example, an operator at ground command center 112 (shown in FIG. 1). A verification device 470 in passenger compartment 414 enables an operator to verify user 102 has boarded rescue pod 400. In the exemplary embodiment, verification device 470 is a camera that enables the operator to observe user 102 within passenger compartment 414. Alternatively, verification device 470 is a switch operable by user 102 such that when user 102 operates the switch, a signal is transmitted to at least one of unmanned aerial vehicle 108 and ground command center 112 to confirm that user 102 has boarded rescue pod 400. Harness 460, light 462, oxygen source 464, portable first aid kit 466, radio 468, and/or verification device 470 may be mounted on floor 422, ceiling 440, and/or any other interior surface of passenger compartment 414. In some embodiments, rescue pod 400 includes a switch (not shown).

Figure 6:
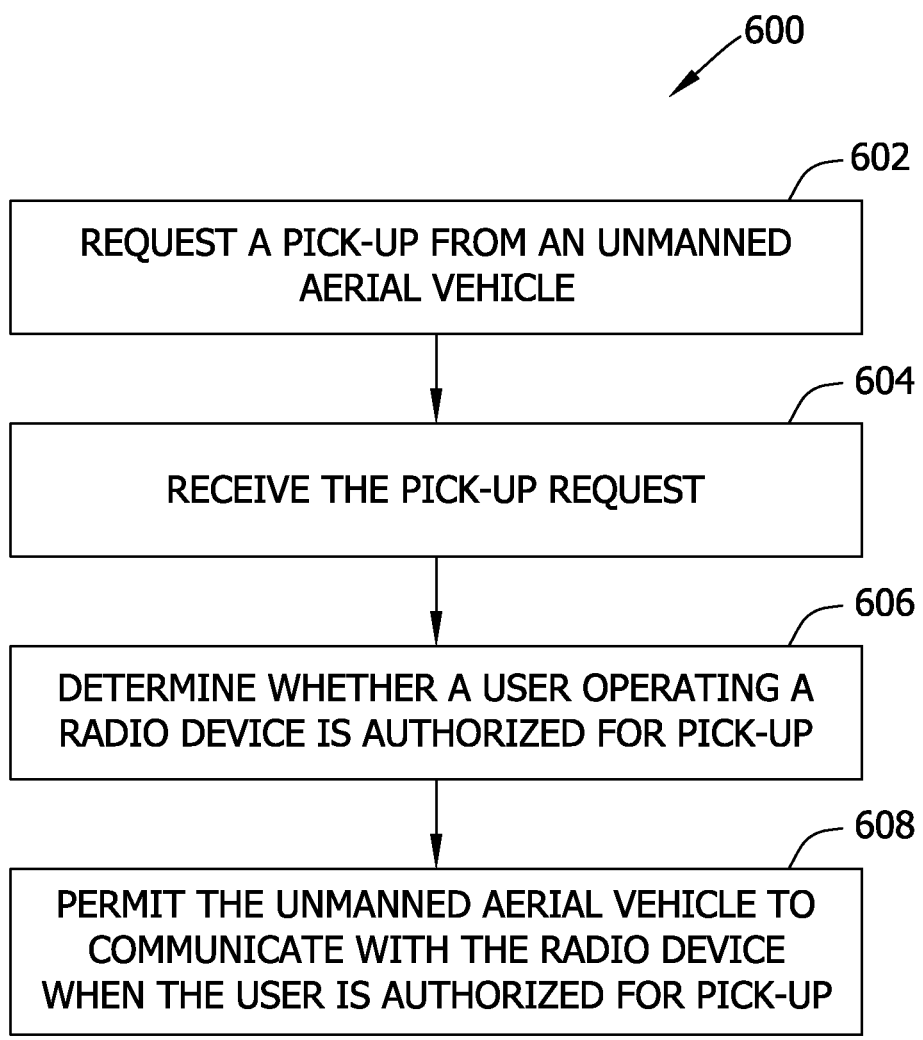
FIG. 6 is a flowchart of an exemplary authorization process that may be used with the system shown in FIG. 1.

FIG. 6 is a flowchart of an exemplary authorization process 600 that may be used with system 100 (shown in FIG. 1). In process 600, a user, such as user 102 (shown in FIG. 1), requests 602 a pick-up from an unmanned aerial vehicle, such as unmanned aerial vehicle 108 (shown in FIG. 1). In the exemplary embodiment, the user requests 602 pick-up by communicating with the unmanned vehicle and/or a ground command center, such as ground command center 112 (shown in FIG. 1). The user communicates using a radio device, such as radio device 104 (shown in FIG. 1).

An operator at the ground command center 112, receives 604 the pick-up request, and determines 606 whether the user is authorized for pick-up. To determine 606 whether the user is authorized, the operator may attempt to verify the identity of the user. The user may verify his or her identity by using the radio device to transmit an authorization code, a voice message, and/or a text message. The user may also verify his or her identity by transmitting an image of the user acquired using the radio device. Once the operator determines 606 the user is authorized for a pick-up, the operator permits 608 the unmanned aerial vehicle to communicate with the radio device such that the unmanned aerial vehicle can determine and travel to the location of the user.

Figure 7:
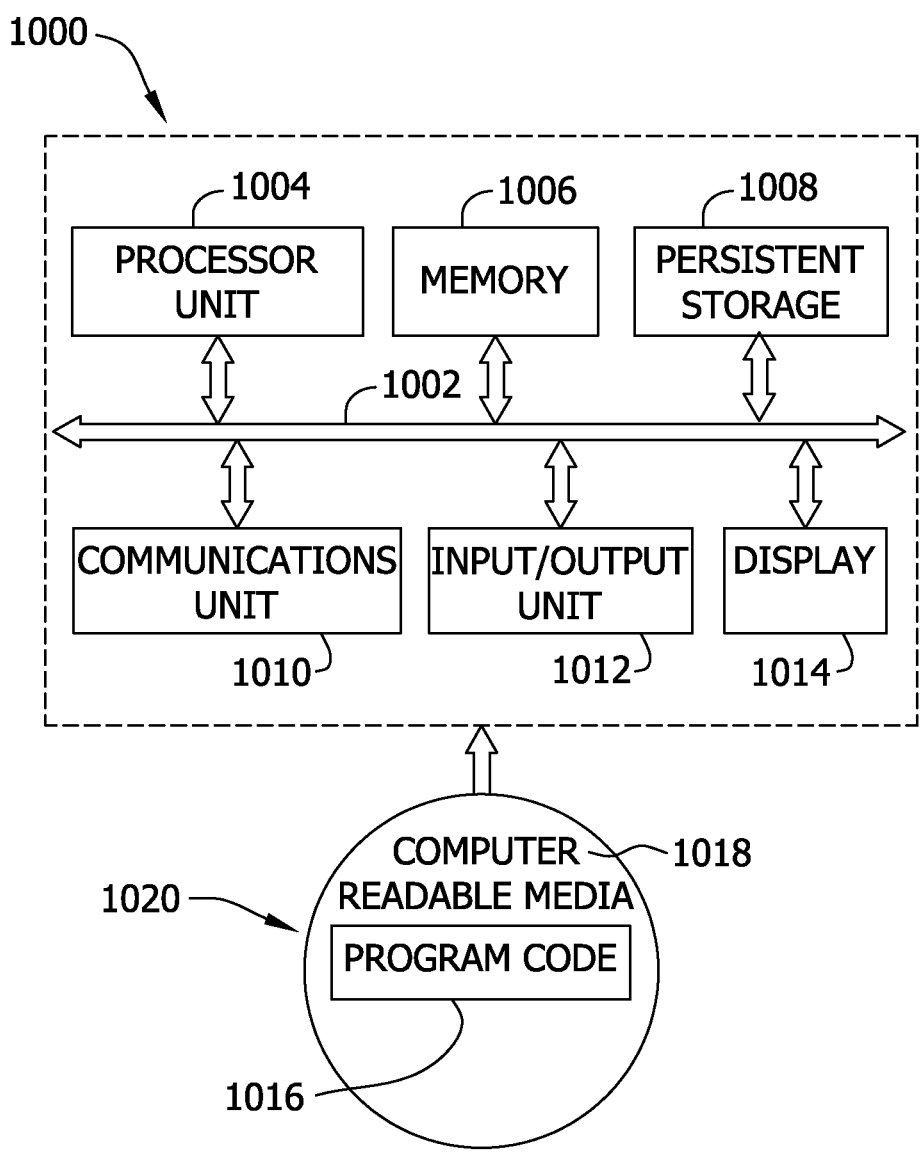
FIG. 7 is a diagram of an exemplary data processing system.

FIG. 7 is a diagram of an exemplary data processing system 1000 that may be used in implementing one or more of the embodiments described herein. For example, GPS module 202, communications module 204, input module 206, communications module 302, control module 304, and/or observation module 306 may be implemented using data processing system 1000. In the exemplary embodiment, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip.

As another illustrative example, processor unit 1004 may be a symmetric multi-processor system containing multiple processors of the same type. Further, processor unit 1004 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 1006 and persistent storage 1008 are examples of storage devices. A storage device is any piece of hardware that is capable of storing information either on a temporary basis and/or a permanent basis. Memory 1006, in these examples, may be, for example, without limitation, a random access memory or any other suitable volatile or non-volatile storage device. Persistent storage 1008 may take various forms depending on the particular implementation.

For example, without limitation, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, without limitation, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communication links.

Input/output unit 1012 allows for input and output of data with other devices that may be connected to data processing system 1000. For example, without limitation, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer usable program code, or computer readable program code that may be read and executed by a processor in processor unit 1004. The program code in the different embodiments may be embodied on different physical or tangible computer readable media, such as memory 1006 or persistent storage 1008.

Program code 1016 is located in a functional form on computer readable media 1018 that is selectively removable and may be loaded onto or transferred to data processing system 1000 for execution by processor unit 1004. Program code 1016 and computer readable media 1018 form computer program product 1020 in these examples. In one example, computer readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer readable media 1018 also may take the form of a persistent storage, such as a hard drive, a thumb drive, or a flash memory that is connected to data processing system 1000. The tangible form of computer readable media 1018 is also referred to as computer recordable storage media. In some instances, computer readable media 1018 may not be removable.

Alternatively, program code 1016 may be transferred to data processing system 1000 from computer readable media 1018 through a communications link to communications unit 1010 and/or through a connection to input/output unit 1012.

The communications link and/or the connection may be physical or wireless in the illustrative examples. The computer readable media also may take the form of non-tangible media, such as communications links or wireless transmissions containing the program code.

In some illustrative embodiments, program code 1016 may be downloaded over a network to persistent storage 1008 from another device or data processing system for use within data processing system 1000. For instance, program code stored in a computer readable storage medium in a server data processing system may be downloaded over a network from the server to data processing system 1000. The data processing system providing program code 1016 may be a server computer, a client computer, or some other device capable of storing and transmitting program code 1016.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 7 can be varied from the illustrative examples shown.

As one example, a storage device in data processing system 1000 is any hardware apparatus that may store data. Memory 1006, persistent storage 1008 and computer readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 1006 or a cache such as that found in an interface and memory controller hub that may be present in communications fabric 1002.

The embodiments described herein facilitate retrieving personnel. A user operates a hand held radio to communicate with an unmanned aerial vehicle and a command center. When the command center authorizes communication between the unmanned aerial vehicle and the hand held radio, the hand held radio transmits information indicating a position of the user to the unmanned aerial vehicle. The unmanned aerial vehicle uses the position information to travel to the location of the user. Once the unmanned aerial vehicle reaches the user, the user boards a rescue pod attached to the unmanned aerial vehicle, and the unmanned aerial vehicle transports the rescue pod and the user to a different location.

Unlike at least some known personnel retrieval systems and methods, because the systems and methods described herein utilize an unmanned aerial vehicle, the systems and methods described herein do not put additional personnel at risk when attempting to rescue stranded personnel. The unmanned aerial vehicle may also be capable of higher, faster, quieter, and/or longer flight than at least some known manned rescue vehicles. Further, as compared to at least some known personnel retrieval systems and methods, the radio device described herein securely communicates with the unmanned aerial vehicle to enable the unmanned aerial vehicle to travel to the location of the user more quickly and accurately. Moreover, the rescue pod described herein enables safe and efficient retrieval of the stranded personnel.

The embodiments described herein may utilize executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personnel extraction system comprising:
   a hand held radio operable to transmit a position of said radio;
   an unmanned aerial vehicle operable to receive a radio signal indicating a real-time position of personnel to be retrieved, deploy to the real-time position, and transport the personnel to a different location;
   a rescue pod coupled to said unmanned aerial vehicle and sized to house the personnel, said rescue pod comprising at least one aerodynamic fairing at an end of said rescue pod and at least one door, said aerodynamic fairing detachable from a body of said rescue pod such that the personnel can exit said rescue pod through said end; and
   a command center operable to control a deployment of said unmanned aerial vehicle.

2. The personnel extraction system according to claim 1 wherein said hand held radio is configured to periodically send position updates, said system configured to provide the position updates to at least one of said unmanned aerial vehicle and said command center.

3. The personnel extraction system according to claim 1 wherein said unmanned aerial vehicle is controlled by at least one of a remote operator at said command center and an autonomous autopilot.

4. The personnel extraction system according to claim 1 wherein said unmanned aerial vehicle comprises an onboard camera mounted thereon, images from said onboard camera utilized to monitor operation of said unmanned aerial vehicle.

5. The personnel extraction system according to claim 4 wherein the images are received by at least one of said command center and said hand held radio.

6. The personnel extraction system according to claim 1 wherein said unmanned aerial vehicle is operable to fly a flight profile that includes at least one of flying directly to the real-time position, flying to the real-time position using terrain masking, and flying to the real-time position using a nap of the earth flight profile.

7. The personnel extraction system according to claim 1 wherein said hand-held radio comprises a combat survivor evader locator (CSEL) radio.

8. The personnel extraction system according to claim 7 wherein said CSEL radio is operable to command said unmanned aerial vehicle to fly to a location of said CSEL radio.

9. The personnel extraction system according to claim 1 wherein said rescue pod further comprises a release handle operable to detach said at least one aerodynamic fairing.

10. A system for retrieving personnel, said system comprising:
- a hand held radio operable to transmit a position of said radio;
- an unmanned aerial vehicle operable to receive the transmitted position and travel to the transmitted position; and
- a rescue pod coupled to the unmanned aerial vehicle and operable to transport the personnel from the transmitted position, said rescue pod comprising at least one aerodynamic fairing at an end of said rescue pod and at least one door, said aerodynamic fairing detachable from a body of said rescue pod such that the personnel can exit said rescue pod through said end.

11. A system in accordance with claim 10 wherein said rescue pod further comprises a verification device that enables a remote operator to verify the personnel have boarded said rescue pod.

12. A system in accordance with claim 10 wherein said unmanned aerial vehicle is an A160T Hummingbird unmanned utility helicopter.

13. A system in accordance with claim 10 wherein said rescue pod comprises:
- a top wall, a bottom wall, a first side wall, and a second side wall that define a passenger compartment;
- an absorption layer positioned between the bottom wall and a floor of the passenger compartment, said absorption layer operable to absorb an impact force to protect a user positioned within the passenger compartment.

14. A system in accordance with claim 10, wherein said at least one door is a roll-up door operable to roll-up into said top wall.

* * * * *